(12) United States Patent
Olovsson

(10) Patent No.: US 10,670,569 B2
(45) Date of Patent: Jun. 2, 2020

(54) FLUID PATH NETWORKS

(71) Applicant: GE HEALTHCARE BIO-SCIENCES AB, Uppsala (SE)

(72) Inventor: Bjorn Markus Olovsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 114 days.

(21) Appl. No.: 15/738,789

(22) PCT Filed: Jun. 29, 2016

(86) PCT No.: PCT/EP2016/065100
§ 371 (c)(1),
(2) Date: Dec. 21, 2017

(87) PCT Pub. No.: WO2017/001454
PCT Pub. Date: Jan. 5, 2017

(65) Prior Publication Data
US 2018/0188216 A1    Jul. 5, 2018

(30) Foreign Application Priority Data
Jun. 30, 2015 (GB) .................................. 1511463.0

(51) Int. Cl.
| *F16K 27/02* | (2006.01) |
| *G01N 30/38* | (2006.01) |
| *G01N 30/88* | (2006.01) |
| *F16K 27/00* | (2006.01) |
| *F16K 11/085* | (2006.01) |

(52) U.S. Cl.
CPC .......... *G01N 30/38* (2013.01); *F16K 11/0853* (2013.01); *F16K 27/003* (2013.01); *F16K 27/0263* (2013.01); *G01N 30/88* (2013.01); *G01N 2030/8881* (2013.01)

(58) Field of Classification Search
CPC ... F16K 27/003; F16K 27/0263; G01N 30/38; G01N 30/88
See application file for complete search history.

(56) References Cited

U.S. PATENT DOCUMENTS

| 5,487,569 A  | 1/1996  | Silvis et al. |
| 7,146,999 B2 | 12/2006 | Giese et al. |
| 7,726,331 B1 | 6/2010  | Giese |
|              | (Continued) | |

FOREIGN PATENT DOCUMENTS

| EP | 2842628 A1 | 3/2015 |
| WO | 98/54568 A1 | 12/1998 |
|    | (Continued) | |

OTHER PUBLICATIONS

PCT International Search Report and Written Opinion for PCT Application No. PCT/EP2016/065100 dated Sep. 7, 2016 (11 pages).
(Continued)

*Primary Examiner* — Herbert K Roberts
(74) *Attorney, Agent, or Firm* — Eversheds Sutherland (US) LLP

(57) ABSTRACT

Disclosed is a fluid path network (100) comprising plural fluid paths (110) interconnected by plural nodal chambers (120), three or more of said plural paths opening into each of said chambers, and said chambers being adapted the accept a removable fluid path modifying insert (130/140/150 FIGS. 3a-3c). The network is employed in a chromatography system described herein.

3 Claims, 6 Drawing Sheets

(56) References Cited

U.S. PATENT DOCUMENTS

| | | |
|---|---|---|
| 2001/0011557 A1 | 8/2001 | Pecci et al. |
| 2004/0226884 A1 | 11/2004 | O'Connor et al. |
| 2006/0027373 A1 | 2/2006 | Carriere et al. |
| 2006/0185746 A1 | 8/2006 | Doyle |

FOREIGN PATENT DOCUMENTS

| | | |
|---|---|---|
| WO | 2012/057676 A1 | 5/2012 |
| WO | 2015/094095 A1 | 6/2015 |

OTHER PUBLICATIONS

GB Search Report for GB Application No. 1511463.0 dated Apr. 25, 2016 (5 pages).

FLUID PATH NETWORKS

CROSS REFERENCE TO RELATED APPLICATIONS

This application claims the priority benefit of PCT/EP2016/065100 filed on Jun. 29, 2016 which claims priority benefit of Great Britain Application No. 1511463.0 filed Jun. 30, 2015. The entire contents of which are hereby incorporated by reference herein.

FIELD OF THE INVENTION

The present invention relates to reconfigurable fluid flow path networks, in particular disposable reconfigurable fluid flow path networks, for example for use in liquid chromatography.

BACKGROUND OF THE INVENTION

Small scale liquid chromatography systems exist which generally comprise a number of chromatography process components interconnected by capillary tubes. The functionality of the systems can be improved by including valves for switching flows between components, or for switching flows to clean the system when an experiment or small scale process has been completed. Cleaning of the valves and multiple capillaries used can be particularly time consuming because every valve position and tube needs to be subjected to cleaning for thorough cleaning. When hazardous materials are used, such a cleaning process can be extremely time consuming. The inventor has realised that a disposable fluid path network could be employed to reduce cleaning time and/or make cleaning less hazardous where hazardous fluids are processed. However, this is not a straight forward step, because conventionally, expensive chromatography components are used, interconnected by lower cost tubes, so merely despising of the tubes does not save any cleaning time, because the internal fluid paths of the components needs to be cleaned also. As well as that, to be versatile, the fluid path system needs to be easily reconfigurable, so that different experimental set-ups can be made quickly.

The inventor has devised a way to make the valve components of the chromatography system and the interconnecting fluid path network suitably low cost to make them disposable, whilst simplifying the fluid paths of the remaining components so that they can be cleaned easily, either when connected to the disposable fluid path network, or afterwards. The inventor has also devised a fluid path system which is simple to reconfigure.

SUMMARY OF THE INVENTION

The invention provides a fluid path network according to claim 1 and a chromatography system according to claim 6. Preferred features of the invention are set out it dependent claims.

The invention extends to any combination of features disclosed herein, whether or not such a combination is mentioned explicitly herein. Further, where two or more features are mentioned in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein:

The invention, together with its objects and the advantages thereof, may be understood better by reference to the following description taken in conjunction with the accompanying drawings, in which like reference numerals identify like elements in the Figures.

Referring to FIG. 1 a fluid path network 100 is shown, which comprises a multiplicity of fluid paths in the form of tubes, for brevity only some of which are given the reference 110. At each of their ends, the otherwise closed tubes open into a nodal chamber 120, which provides a fluidic link between the tubes in use.

Figure 1:
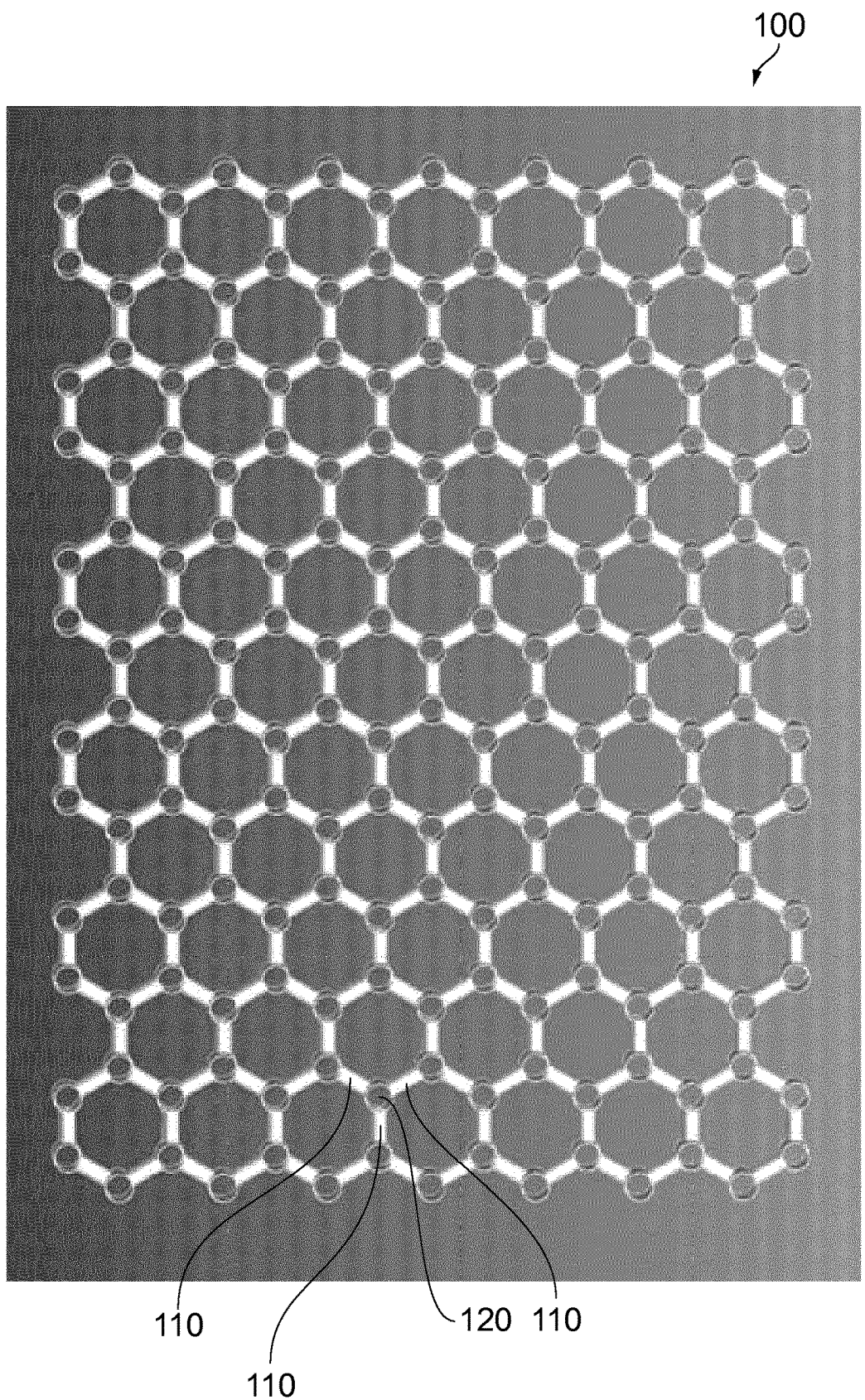
FIG. 1 shows a pictorial view of a fluid path network.

In the embodiment shown in FIG. 1, each nodal chamber 120 has three incoming tubes 110, except at the edges of the network where the chambers 120 have just two tubular connections 110.

Figure 2:
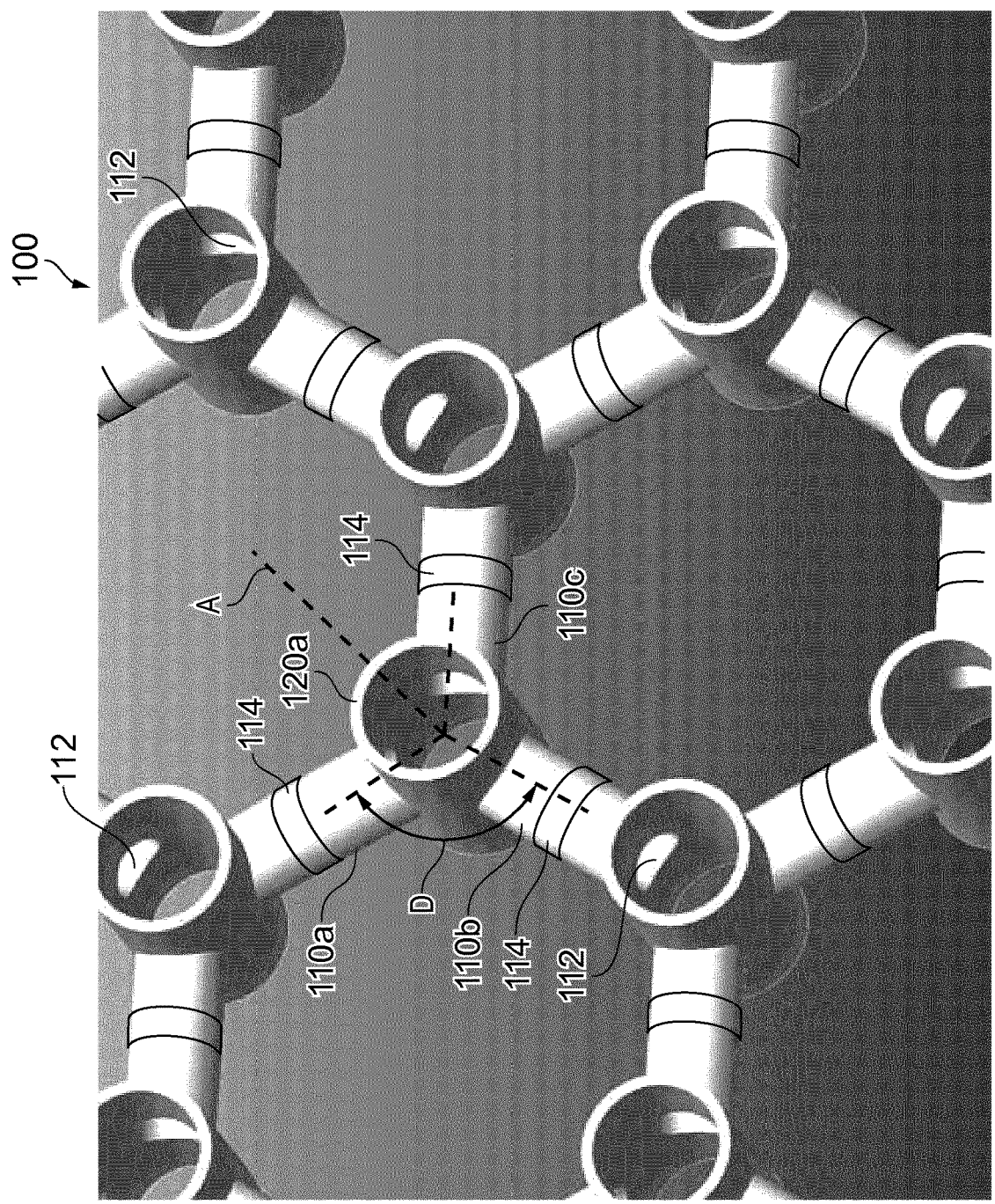
FIG. 2 shows an enlarged view of part of the network shown in FIG. 1.

FIG. 2 shows the network features in more detail. Each chamber 120 is an open ended cylinder and has an axis A. The tubes 110, have openings 112 which open into the chambers 120. The tubes, in this example tubes 110*a*, 110*b* and 110*c*, each extend radially away from the axis A in different directions, such that they form a branch, with adjacent branches having approximately a 120-degree divergence angle D. It is preferred that the network is made from a moulded plastics material, for example: HDPE; Polyamide; ABS; PEEK; or PTFE. In this embodiment tubes 110*a*, 110*b* and 110*c*, as well as chamber 120*a* are moulded as one assembly for interconnecting to adjacent assemblies in use, for example by the use of adapter collars 114. In this way the majority of the network can be made from the same branched component, except for the edges of the network where a chamber with just two branches should be used. Of course, a moulding formed from larger pieces is possible, or the whole network shown in FIG. 1 can be moulded in one piece.

Figure 3A:
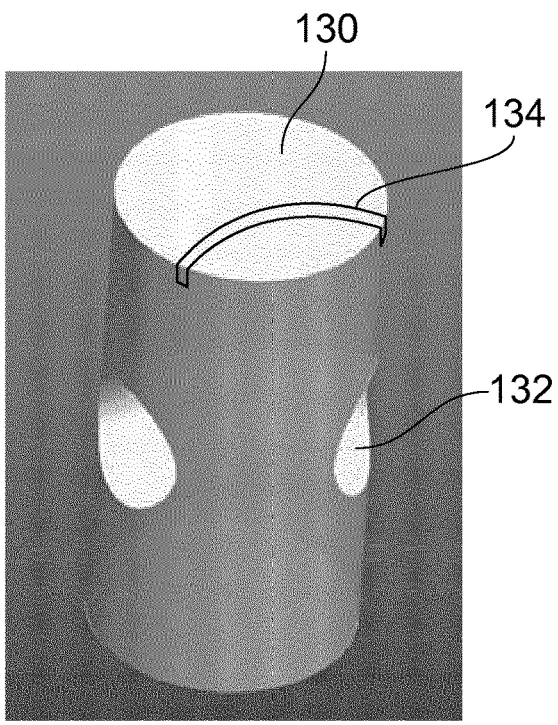
FIGS. 3*a*, 3*b* and 3*c* show pictorial views of inserts which fit into the fluid path network shown in FIGS. 1 and 2.

FIG. 3*a* shows an insert in the form of a fluid diverting plug 130 which can be inserted into any one of the chambers 120 shown in FIGS. 1 and 2. The plug 130 is a fluid tight fit in the chamber 120. The plug includes a through passage 132, which, when the plug is inserted fully into a chamber 120 and aligned correctly about axis A, can provide fluid communication between two adjacent fluid tubes 110. The plug 130 can also be turned such that it is misaligned and will thereby obstruct or partially obstruct fluid flow between all adjacent nodally connected tubes 110, and thereby will act like a fluid stop. At the top of the insert is groove 134 which corresponds to the position of the through passage 132 and can be used to guide manual alignment in use.

Figure 3B:
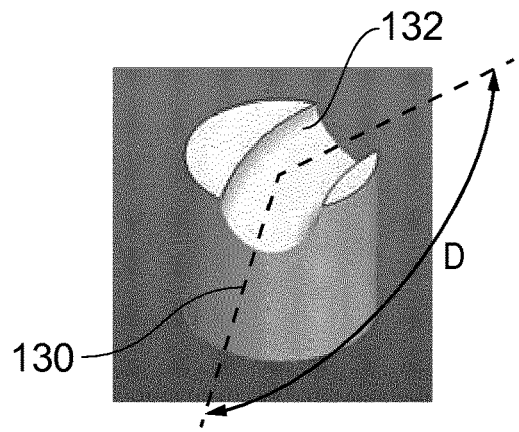

FIG. 3*b* shows a further view of the fluid diverting plug 130, sectioned through the passage 132, and better showing that the through passage 132 is curved such that aligns with the divergent branches of the tubes 110 at an angle D of about 120 degrees.

Figure 3C:
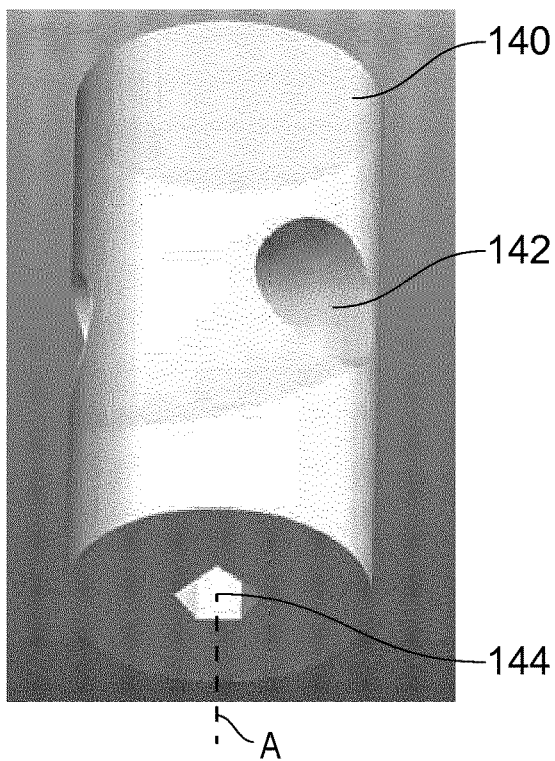

FIG. 3*c* shows an insert 140, in the form of a valve stem which is similar to the plug 130, in that it includes a through passage 142. Valve stem 140 additionally includes an irregular blind aperture 144 which is intended to mate with the rotor actuator shaft of a valve mechanism, and thereby to allow electronically or automatically controlled opening or obstruction of the tubes 110 in use.

Figure 3D:
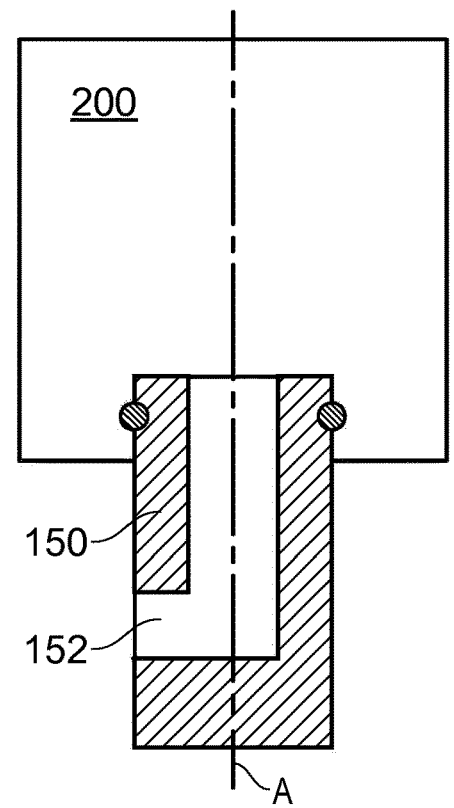

FIG. 3d shows another insert, in the form of a fluid transfer inlet/outlet adapter 150, in fluid communication with a fluidic unit 200, which unit is described in more detail below. The fluid transfer insert 150 is rotatable about axis A, such that an inlet/outlet 152 can be aligned with one of the openings 112 of the tubes 110, in use. The insert 150 can be modified so that it includes both an inlet and an outlet fluid path for compactness, which paths will each connect to one of the openings 112. Similar inserts can be used to connect to conventional capillary tubes, instead of the unit 200.

Figure 4:
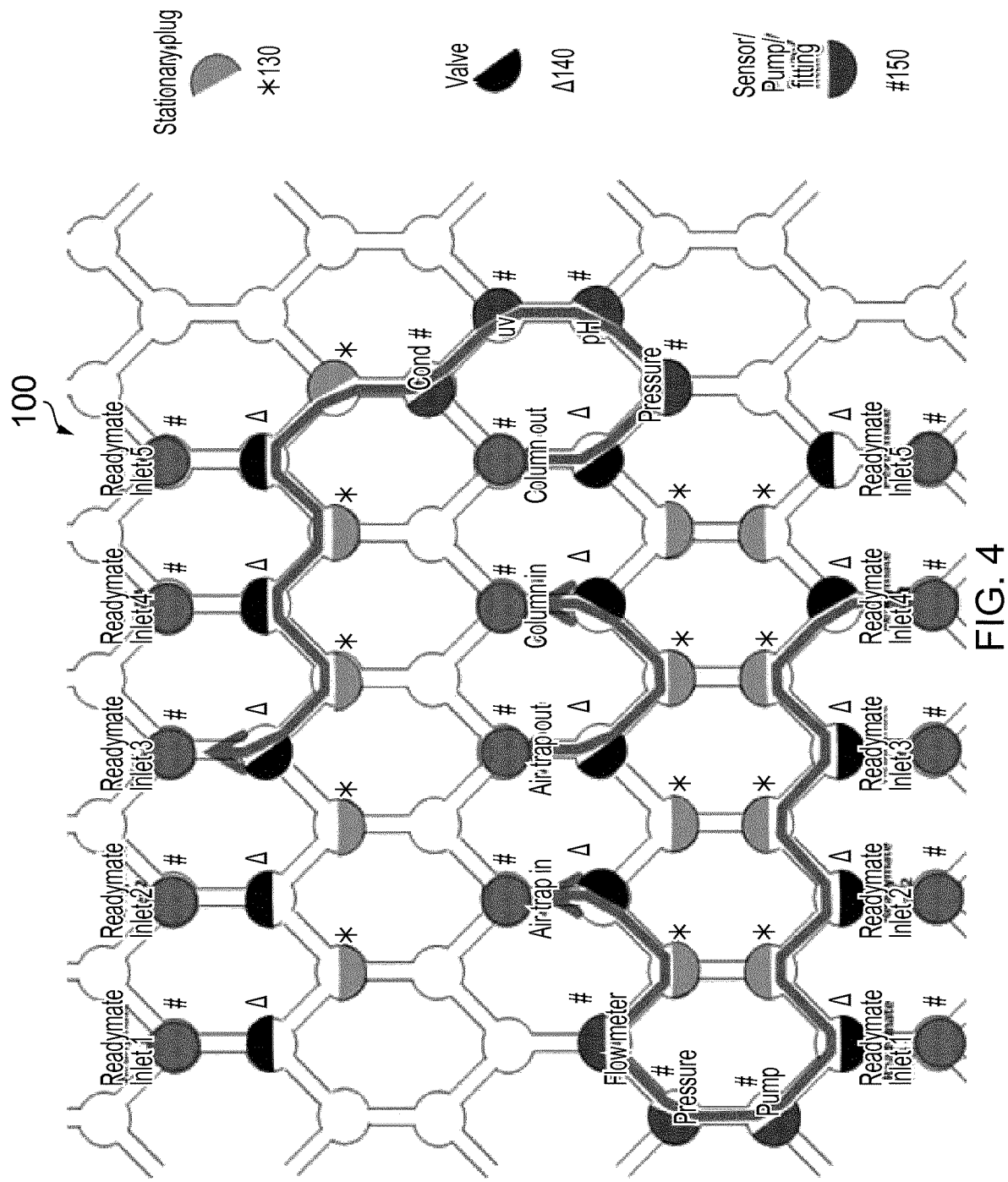
FIG. 4 shows one possible fluid path arrangement in the network shown in FIG. 1.

FIG. 4 shows a typical example of a chromatography fluid path, including the tubular fluid path network arranged with inserts to direct fluid, and to control the fluid flow through valve-like inserts. Where a separating column, sensor, monitor, pump or the like peripheral fluidic unit is needed, these processes can be performed outside the network by diverting fluid flow through inserts 150 described above, either directly into said unit, or via conventional capillary tubes.

Figure 5:
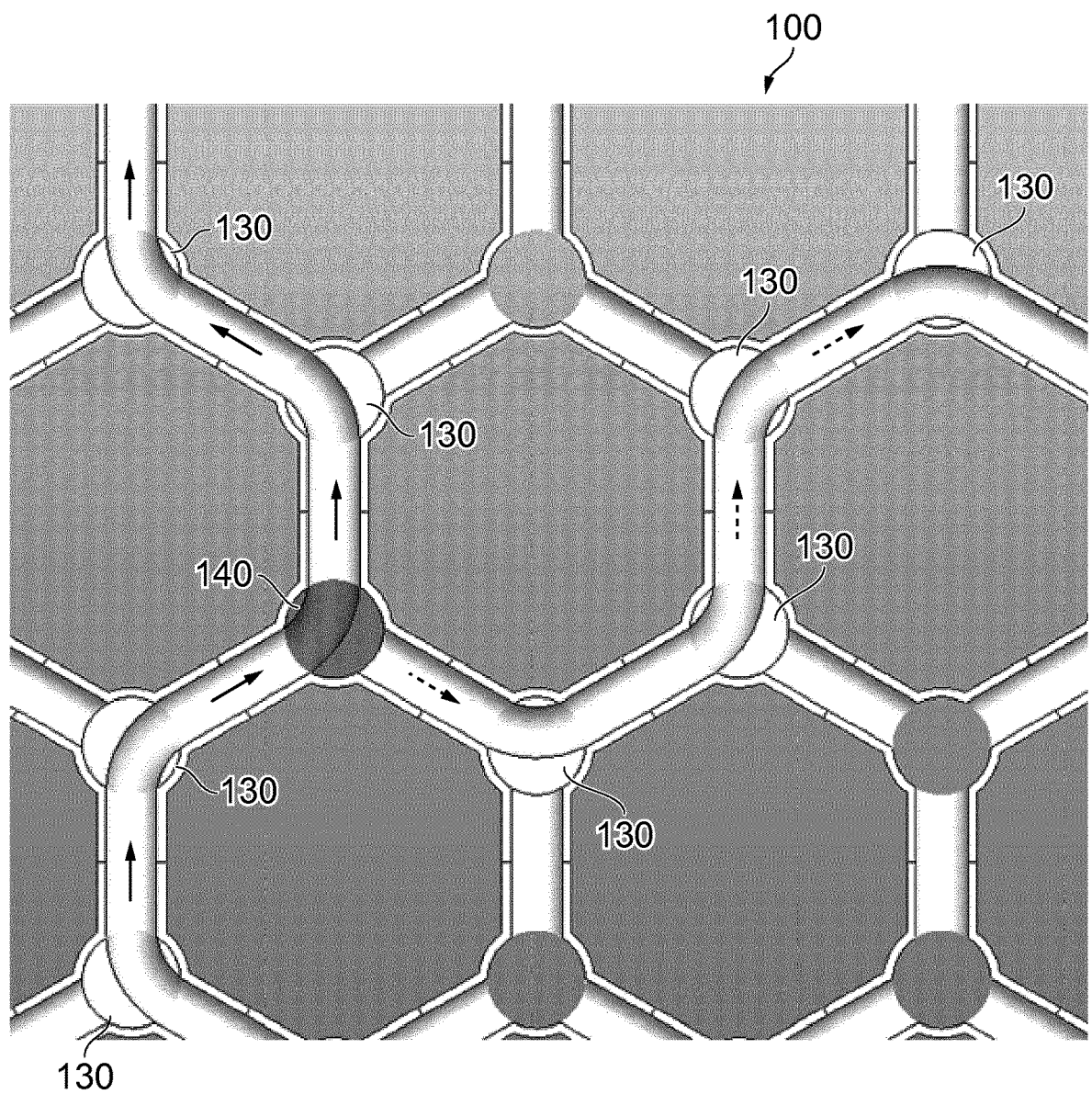
FIG. 5 shows an enlarged view of another possible fluid path arrangement.

FIG. 5 shows an enlarged view of a further typical fluid path routing using the inserts mentioned above, and showing how the valve stem insert 140 can divert flow.

Figure 6A:
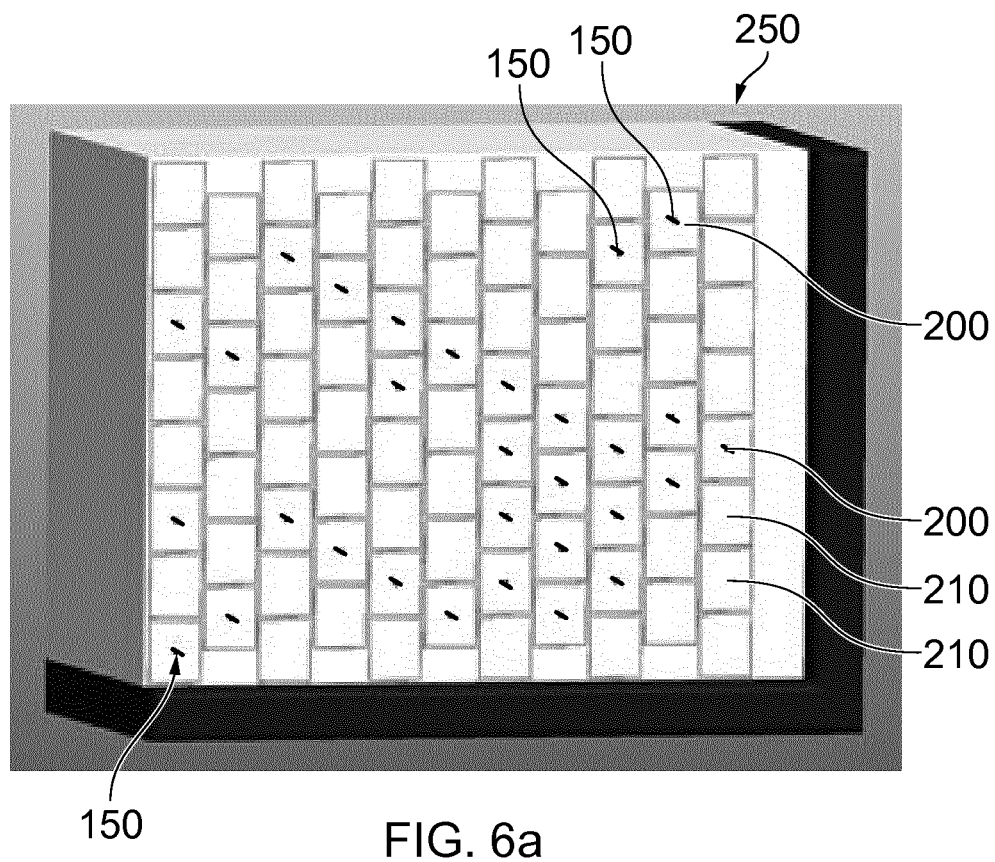
FIGS. 6*a* and 6*b* show a liquid chromatography system employing the fluid path network shown in previous Figures.
Figure 6B:
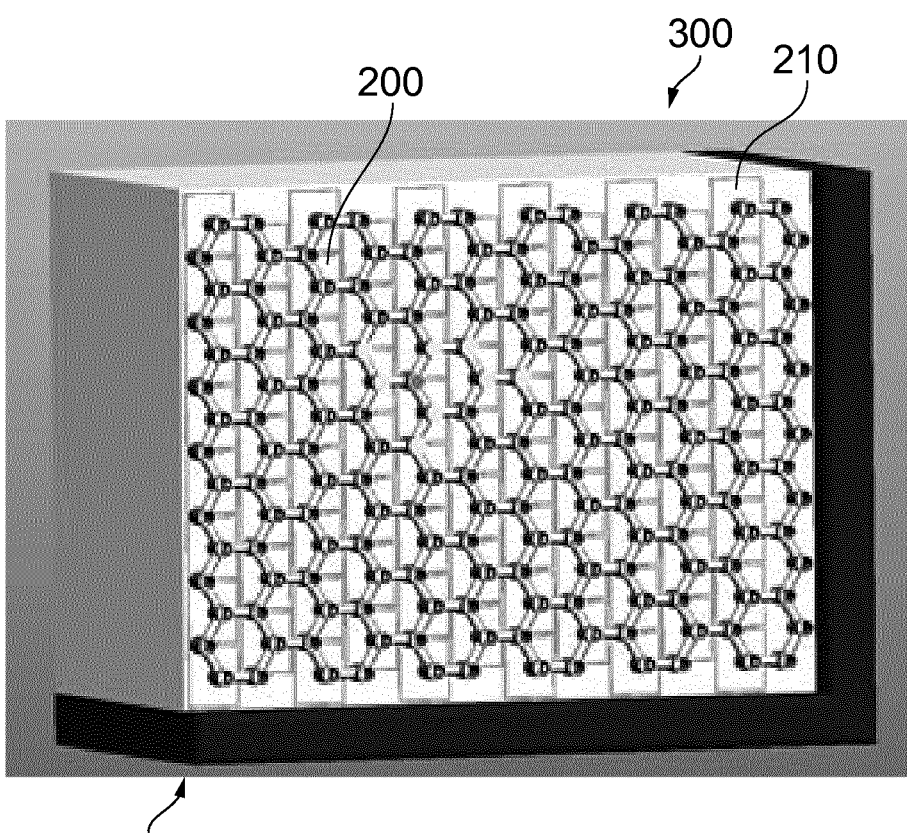

FIG. 6a shows an array 250 of stacked chromatography units 200, which have inserts 150, or valve stem insert actuators, which are in an array, to coincide with the chambers 120 of the tubular network 100. In this way the units 200 can be mated with the network 100, to provide a complete chromatography system 300 as shown in FIG. 6b. Dummy units 210 can be used to infill any gaps in the array. Thus the units 200 can be assembled in any suitable order, and the fluid path network 100 can be made both easy to configure and reconfigure, as well as being disposable should cleaning be important. Units 200 may comprise one or more of: a chromatography column; a pressure sensor; a conductivity monitor; a UV monitor; a pump; a fluid reservoir; or a filter a pH monitor Although embodiments have been described and illustrated, it will be apparent to the skilled addressee that additions, omissions and modifications are possible to those embodiments without departing from the scope of the invention claimed. For example, a three tube system has been shown where three tubes 110 are connected to each nodal point 120. However, it is possible to use a four tube system, or even more tubes if needed. The network parts have been shown generally without seals, but sealing means may be provided, for example 'O' rings could be used at the joints to inhibit leakage. Other sealing means could be employed, for example complementary tapered fittings. The embodiments provide a two dimensional array of interconnectable fluid paths coming together at a plurality nodal chambers at which the various fluid path modifying inserts can be removeably inserted to effect fluid manipulations, for example switching flows in different directions, providing a take-off for a bio-processing module, the blanking (stopping) of fluid paths etc. collectively providing a versatile low cost fluid interconnection system system which can be readily configured or reconfigured if needed. The embodiments are preferably formed from rigid moulded plastics to form the array which is self-supporting and/or preferably the fluid path modifying inserts are each capable of fitting in any one of the chambers. A three dimensional array is possible also.

The invention claimed is:

1. A fluid path network comprising plural fluid paths interconnected by plural nodal chambers, three or more of said plural paths opening into each of said chambers, and further comprising a plurality of fluid path modifying inserts adapted to fit into any one of the chambers, wherein the chambers are arranged in an array, held in position by tubular walls of the fluid paths, wherein the chambers are cylindrical and have at least one open end to accept said inserts, wherein the chambers are formed around an axis, and said three or more fluid paths extend radially away from each chamber, and wherein at least a group of the plural fluid path modifying inserts are removably insertable into said chambers for modifying the fluid paths, and comprise a valve stem selectively rotatable about the axis during operation for interconnecting two or more of the at least three fluid paths.

2. A reconfigurable chromatography fluid path network for interconnecting chromatography fluidic units, the network comprising plural tubular fluid paths interconnected by plural nodal cylindrical chambers formed around an axis, three or more of said plural paths opening into each of said chambers and extend radially away from each chamber toward another of the plural nodal chambers, wherein the chambers are arranged in an array held generally in position by tubular walls of the fluid paths, and wherein said chambers have an open end for accepting a removable fluid path modifying insert, and a group of the removable fluid path modifying inserts comprising a valve stem selectively rotatable about the axis during operation for interconnecting two or more of the at least three fluid paths.

3. A chromatography fluid path network as claimed in claim 2, further comprising additional groups of removable fluid path modifying inserts selected from a group of inserts comprising a plug for obstructing one or more of the at least three fluid paths, but connecting two or more of the at least three fluid paths, and a group of inserts comprising an adapter for transferring fluid away from or toward the network.

* * * * *